United States Patent [19]

Holland et al.

[11] E Patent Number: Re. 33,183

[45] Reissued Date of Patent: Mar. 20, 1990

[54] IMAGE INTENSIFIERS AND METHOD OF PRODUCING SAME

[75] Inventors: David G. Holland, Braintree; Peter B. Banks, Rawreth, both of England

[73] Assignee: English Electric Valve Company, Limited, Chelmsford, England

[21] Appl. No.: 166,479

[22] Filed: Mar. 10, 1988

Related U.S. Patent Documents

Reissue of:

[64] Patent No.: 4,613,786
Issued: Sep. 23, 1986
Appl. No.: 659,543
Filed: Oct. 10, 1984

[30] Foreign Application Priority Data

Oct. 11, 1983 [GB] United Kingdom ..... 8327115

[51] Int. Cl.[4] ..... H01J 40/18; C03B 29/00

[52] U.S. Cl. ..... 313/528; 65/36; 65/48; 65/61; 250/213 VT; 313/530; 313/544

[58] Field of Search ..... 65/36, 48, 54, 61, 42; 250/213 R, 213 VT; 313/524, 528, 530, 544, 534

[56] References Cited

U.S. PATENT DOCUMENTS 3,361,548 1/1968 Hamilton et al. ..... 65/42 X
4,065,283 12/1977 Asahara et al. ..... 65/61 X
4,108,621 8/1978 Asahara et al. ..... 65/61 X
4,265,652 5/1981 Goto et al. .
4,393,322 7/1983 Siegmund ..... 313/544
4,406,973 9/1983 Stowe ..... 313/541
4,475,059 10/1984 Sink .

*Primary Examiner*—Robert L. Lindsay
*Attorney, Agent, or Firm*—Spencer & Frank

[57] ABSTRACT

A shielded faceplate for use in an image intensifier having a photocathode which comprises an inner core of glass transparent to light to which the photocathode is sensitive and an outer shielding region of glass which absorbs light to which the photocathode is sensitive. The outer shielding region surrounds and is adjacent to the inner core. The inner core has a transverse dimension which decreases along its length, the transverse dimension being smallest at the photocathode surface. The shielded faceplate is manufactured by arranging in a mold to which glass does not bond a first type of glass transparent to light to which the photocathode is sensitive and a second type of glass which absorbs light to which the photocathode is sensitive, heating the glass members so that they fuse to produce a block having an inner core of the first type of glass and an outer region of the second type of glass and removing the block from the mold.

14 Claims, 4 Drawing Sheets

IMAGE INTENSIFIERS AND METHOD OF PRODUCING SAME

Matter enclosed in heavy brackets [ ] appears in the original patent but forms no part of this reissue specification; matter printed in italics indicates the additions made by reissue.

FIELD OF THE INVENTION

This invention relates to image intensifiers and is particularly concerned with the image intensifier faceplates and a method of manufacturing them.

BACKGROUND OF THE INVENTION

A conventional image intensifier is illustrated in FIG. 1, which is a longitudinal section. It comprises a glass faceplate 1 on which a photocathode 2 is laid down, a micro-channel plate electron multiplier 3 and a phosphor screen 4 on a glass substrate 5. The glass faceplate 1 and substrate 5 form the end windows, of a vacuum envelope in which the other elements are contained. In operation an optical image is focussed on the photocathode 2 by an external lens, causing electrons to be emitted. The electrons are accelerated to the electron multiplier 3 where they are increased in number by secondary emission at the channel walls. The secondary electrons are then accelerated towards the phsophor screen 4 by a potential difference set up between it and the electron multiplier 3, producing an optical image corresponding to the image focussed on the photocathode 2 but of very much greater intensity. By increasing the potential difference, a typical value being several thousand volts, the intensification produced is increased. The flat surfaces of the photcathode 2, electron multiplier 3, and phosphor screen 4 must be closely spaced and parallel to ensure good definition in the final image. To achieve this without discharge breakdown occurring between electrical connections 6 to the photocathode 2, electron multiplier 3 and phosphor screen 4, the glass faceplate 1 and glass substrate 5 have central raised portions extending towards the electron multiplier 3. Thus the electrical connections 6 are spaced much further apart than would otherwise be the case.

In such an image intensifier light incident at the periphery of the glass faceplate 1 may undergo reflection within the faceplate 1, as shown at 7, resulting in spurious signals. This may be reduced by employing a shielded faceplate consisting of a central transparent region surrounded by light absorbing material.

In a previous method of manufacturing such a shielded faceplate a cylindrical clear glass rod 8 is inserted into a black glass tube 9, as shown in FIG. 2. The rod 8 and tube 9 are surrounded by a tubular clear glass envelope 10 which is evacuated. The temperature is then raised until the glasses fuse (FIG. 3) producing a solid cylindrical block. This is sliced transversely to its longitudinal axis X. One of the slices is shown in FIG. 4. The slice is then machined to the required shape shown in FIG. 5, to produce a shielded faceplate having a clear glass core 11 surrounded by an outer region of black glass 12.

This method has a number of disadvantages. The machining required is expensive and, in the case of obtaining the initial black glass tube, is extremely difficult, since its inner surface must be polished to a high quality. In addition, distortions are introduced during the heating process, resulting in a loss of concentricity.

Also the parallel sides of the clear core 11 cause vignetting, or fading of light entering the faceplate at the periphery of the core 11.

SUMMARY OF THE INVENTION

According to a first aspect of the invention there is provided a method of manufacturing a shielded faceplate for use in an image intensifier comprising a photocathode, including the steps of: arranging in a mold a member of a first type of glass, transparent to light to which the photocathode is sensitive, adjacent another member of a second type of glass which absorbs light to which the photocathode is sensitive, the mold being of a material to which glass does not fuse; heating the members so that they fuse, thereby forming a block having a shape conforming to the internal configuration of the mold and having an inner region of the first type of glass and an outer region of the second type of glass, and removing the block from the mold. The term "light" in this Specification should be taken to include infrared and ultra-violet radiation in addition to visible light.

If the photocathode is, for example, sensitive only to near infra-red radiation and the red end of the visible spectrum, the second type of glass could be blue glass. This is advantageous because it may then be visually inspected for flaws, unlike black glass. Since the glasses are shaped by the mold the difficulty and expense of machining incurred in employing the previous method described above is avoided. Also the method according to the invention is much more flexible than the previous method, allowing different shielding configurations to be easily manufactured, and the distortions which occur with the previous method are reduced.

It is preferred that the block formed by the method includes a portion of the first type of glass which is completely encircled by a portion of the second type of glass.

Preferably, the first and second types of glass have substantially the same refractive index. This reduces reflections at the boundary between the two and hence the possibility of spurious signals being generated.

It is preferred that the members are discs which have flat surfaces arranged adjacent each other in the mold. Preferably some of the second type of glass is removed to expose a flat surface of the first type of glass which is bounded by the encircling portion of the second type of glass, allowing light to pass from one side to the other of the faceplate, although the disc of the second type of glass may be annular, in which case such further processing may not be necessary.

Preferably, the members are heated in an inert atmosphere, preventing oxidation.

According to a feature of the invention, a shielded image intensifier faceplate is manufactured by a method according to the invention, and preferably the outer region surrounds the inner region which has a transverse dimension which decreases along its length, being smallest at the photocathode surface.

According to a second aspect of this invention there is provided a shielded faceplate for an image intensifier including a [phtocathode,] *photocathode,* comprising an inner core of glass transparent to light to which the photocathode is sensitive and an outer shielding region of glass which absorbs light to which the photocathode is sensitive which surrounds and is adjacent to the inner core, the inner core having a transverse dimension which decreases along its length, being smallest at the photocathode surface. Such a construction does not tend to suffer from vignetting to the same extent as a conventional shielded faceplate having a parallel sided inner core. Even where the refractive indices of the glasses forming the inner core and outer shielding differ by only a small amount, incoming light striking the boundary between them at a glancing angle (i.e. at a large angle of incidence) will result in a reflected beam of large amplitude. This condition is less likely to occur when the diameter of the inner core [inceases] *increases* from its smallest value at the photocathode to the front of the faceplate which receives the light.

Thus the shielded faceplate permits a much improved operation of an image intensifier; and according to a third aspect of this invention, an image intensifier includes an electron multiplier; a phosphor screen upon which electrons from said multiplier are incident; a photocathode adapted to receive illumination and to emit electrons to the electron multiplier; and a glass faceplate which supports the photocathode, the glass faceplate being in accordance with this invention as previously set out.

DESCRIPTION OF THE PREFERRED EMBODIMENTS

Figure 1:
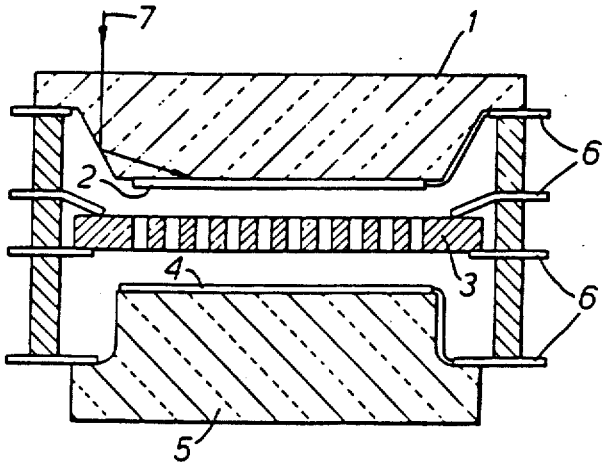
FIG. 1. PRIOR ART
FIG. 1 shows a conventional image intensifier.
Figure 2:
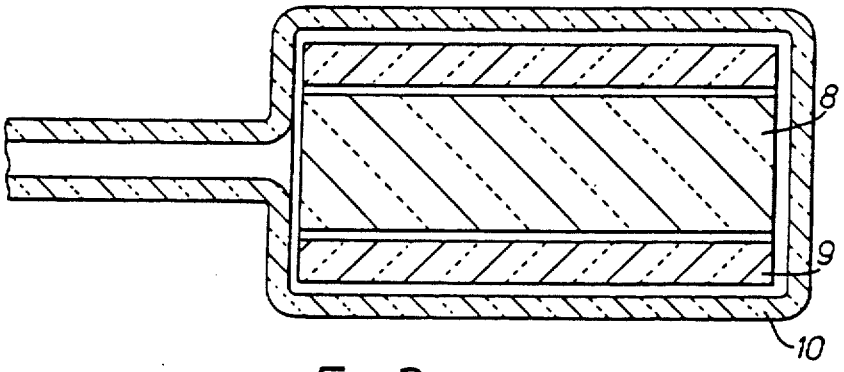
FIG. 2. PRIOR ART
FIG. 2 illustrates a step in the manufacture of the image intensifier of FIG. 1.
Figure 3:
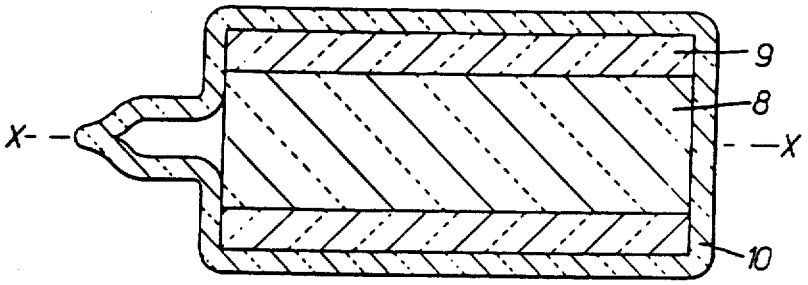
FIG. 3. PRIOR ART
FIG. 3 shows a solid cylindrical block obtained from a second step in the manufacture of the image intensifer of FIG. 1.
Figure 4:
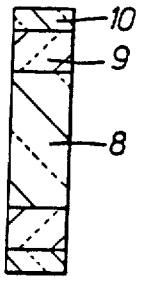
FIG. 4. PRIOR ART
FIG. 4 is a transverse slice taken through the solid cylindrical block of FIG. 3.
Figure 5:
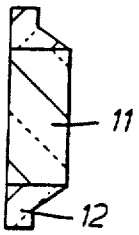
FIG. 5. PRIOR ART
FIG. 5 shows the transverse slice of FIG. 3 after machining.
Figure 6:
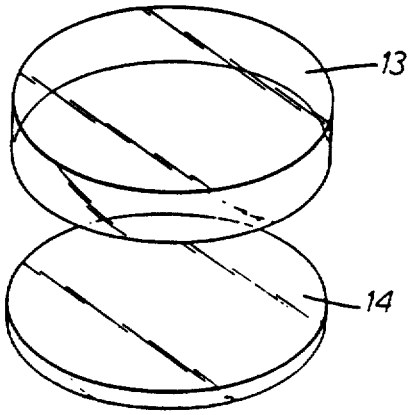
FIG. 6 shows the initial glass members.
Figure 7:
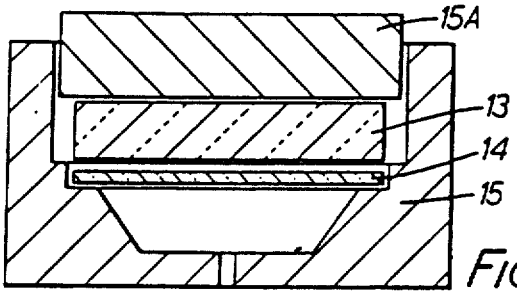
FIGS. 7 to 11 illustrate a method in accordance with the invention and are transverse sections.
Figure 8:
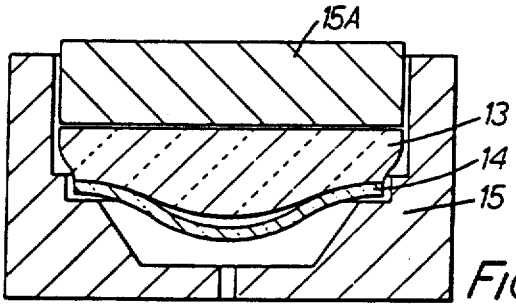
Figure 9:
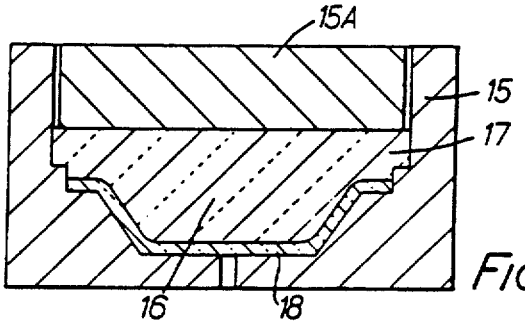
Figure 10:
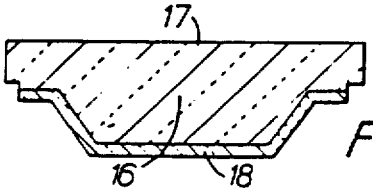

With reference to FIG. 6 a clear glass disc 13 having a diameter of 30 mm and 9 mm thickness and a black glass disc 14 with a diameter of 30 mm and 1.2 mm thick are polished on all surfaces and comprise the start components. They are placed in a cavity of a graphite mold 15 having a movable member 15A (FIG. 7) with the clear glass disc 13 above the black glass disc 14 as shown. The temperature is then raised to about 800° C., when the glasses soften (FIG. 8) and the member 15A moved inwards so that they are forced into contact with the inner walls of the mold 15 defining the cavity. The glasses fuse to form a block 16 having a clear glass region 17 and a region 18 of black glass, as shown in FIGS. 9 and 10. The heating process takes place in an inert atmosphere to prevent oxidation of the mold 15, and initially at reduced pressure.

Fusion will commence in a circumferential region, and thus any gas evolved from the glass surface during the fusion will form a bubble or blister in the enclosed central region. Since at a later stage this part of the block 16 is usually removed (to permit light to pass through the block 16 to the photocathode) the bubble or blister may not be objectionable. However if there are an undesirable number of bubbles the problem may be reduced by drilling a small hole in the centre of the black glass disc 14 prior to the heating process. Then any gases evolved during fusion may escape. The block 16 is then removed from the mold.

Figure 11:
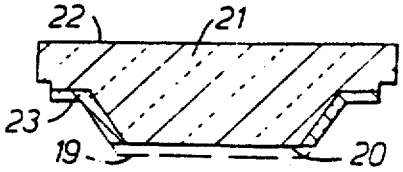

The plane surfaces of the block 16 are then ground down to size (FIG. 11), removing a layer of black glass 19 to form a flat surface 20 (to which the photocathode can be applied), and the surfaces polished. The faceplate thus formed has an inner cylindrical region 21, the radius of which increases along its length from the photocathode surface 20 to the front surface 22 of the faceplate, and a surrounding shielding region 23 of black glass. That is, the inner cylindrical region is in the shape of a truncated cone wherein the upper front surface 22 has a large diameter than the lower flat surface 20.

Figure 12:
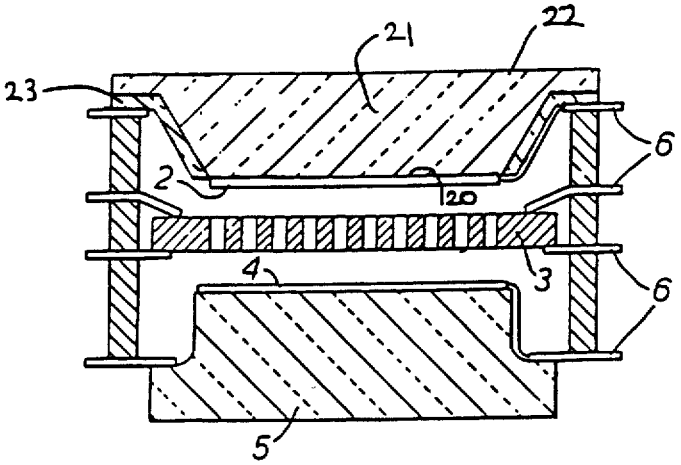
FIG. 12 illustrates an image intensifier in accordance with the invention.

The faceplate manufactured as described above with reference to FIGS. 6 to 11 may then be included in an image intensifier as shown in FIG. 12.

We claim:

1. A method of manufacturing a shielded faceplate for use in an image intensifier comprising a photocathode, including the steps of: arranging in a mold a member of a first type of glass transparent to light to which the photocathode is sensitive, adjacent another member of a second type of glass which absorbs light to which the photocathode is sensitive, the mold being of material to which glass does not bond; heating the members so that they fuse, thereby forming a block having a shape conforming to the internal configuration of the mold and having an inner region of the first type of glass and an outer region of the second type of glass; and removing the block from the mold.

2. A method as claimed in claim 1 and wherein the block so formed includes a portion of the first type of glass which is completely encircled by a portion of the second type of glass.

3. A method as claimed in claim 1 and wherein the first and second types of glass have substantially the same refractive index.

4. A method as claimed in claim 1 and wherein the members are discs which have flat surfaces arranged adjacent each other in the mold.

5. A method as claimed in claim 4 and wherein, after the block is formed, some of the second type of glass is removed to expose a flat surface of the first type of glass which is bounded by the encircling portion of the second type of glass.

6. A method as claimed in claim 1 and wherein the members are heated in an inert atmosphere.

7. A method as claimed in claim 1 and wherein the members are initially heated at reduced pressure.

8. A method as claimed in claim 1 and wherein the material of the mold is graphite.

9. A shielded faceplate for an image intensifer including a photocathode, comprising;

an inner glass member having the shape of a truncated cone, the upper surface of said inner glass member having a greater diameter than the lower surface thereof, said inner glass member being transparent to light to which said photocathode is sensitive; and an outer shielding glass member surrounding and contiguous with the outer surface of said inner glass member, said outer shielding glass member absorbing light to which said photocathode is sensitive, said photocathode being deposited on the lower surface of said inner glass member.

10. A *method of manufacturing a* shielded image intensifier faceplate as claimed in claim 1 and wherein the inner region has a transverse dimension which decreases along its length, being smallest at the photocathode surface, and is surrounded by the outer region.

11. A shielded faceplate for an image intensifier including a [phtocathode] *photocathode*, comprising an inner core *member* of glass transparent to light to which the photocathode is sensitive, and an outer shielding [region] *member* of glass which absorbs light to which the photocathode is sensitive which surrounds and is [adjacent] *fused* to the inner core *member, there being a distinct boundary between said inner core member and said outer shielding member*, the inner core *member* having a transverse dimension which decreases along its length, being smallest at the photocathode surface.

12. An image intensifier including an electron multiplier; a phosphor screen upon which electrons from said multiplier are incident; a photocathode adapted to receive illumination and to emit electrons to the electron multiplier; and a glass faceplate which supports the photocathode, the faceplate being as claimed in claim 11.

13. A method of manufacturing a shielded faceplate for use in an image intensifier having a photocathode, said method including the steps of:

providing a mold having an inner wall defining a cavity which symmetrically surrounds a vertical axis of said mold, the diameter of said cavity being greater at the upper end of said mold than at the lower end thereof, said mold being formed of a material to which glass does not bond;

placing an opaque glass disc into said cavity, said opaque glass disc being made of a material which absorbs light to which said photocathode is sensitive;

placing a transparent glass disc into said cavity with its lower surface adjacent the upper surface of said opaque glass disc, said transparent glass disc being made of a material which is transparent to light to which said photocathode is sensitive;

heating said glass discs to a temperature at which said discs become soft;

forcing said glass discs into contact with the inner walls of said mold, said glass discs thereby forming a block having a shape conforming to the shape of said cavity, an inner region consisting of glass transparent to light to which said photocathode is sensitive and an outer region consisting of glass which is opaque to light to which said photocathode is sensitive; and removing said block from said mold.

14. A method as defined in claim 13 wherein the thickness of said opaque glass disc is less than that of said transparent glass disc.

* * * * *